Feb. 6, 1940.   J. FRIED   2,189,394
APPARATUS FOR TRUING WHEELS
Filed June 27, 1938
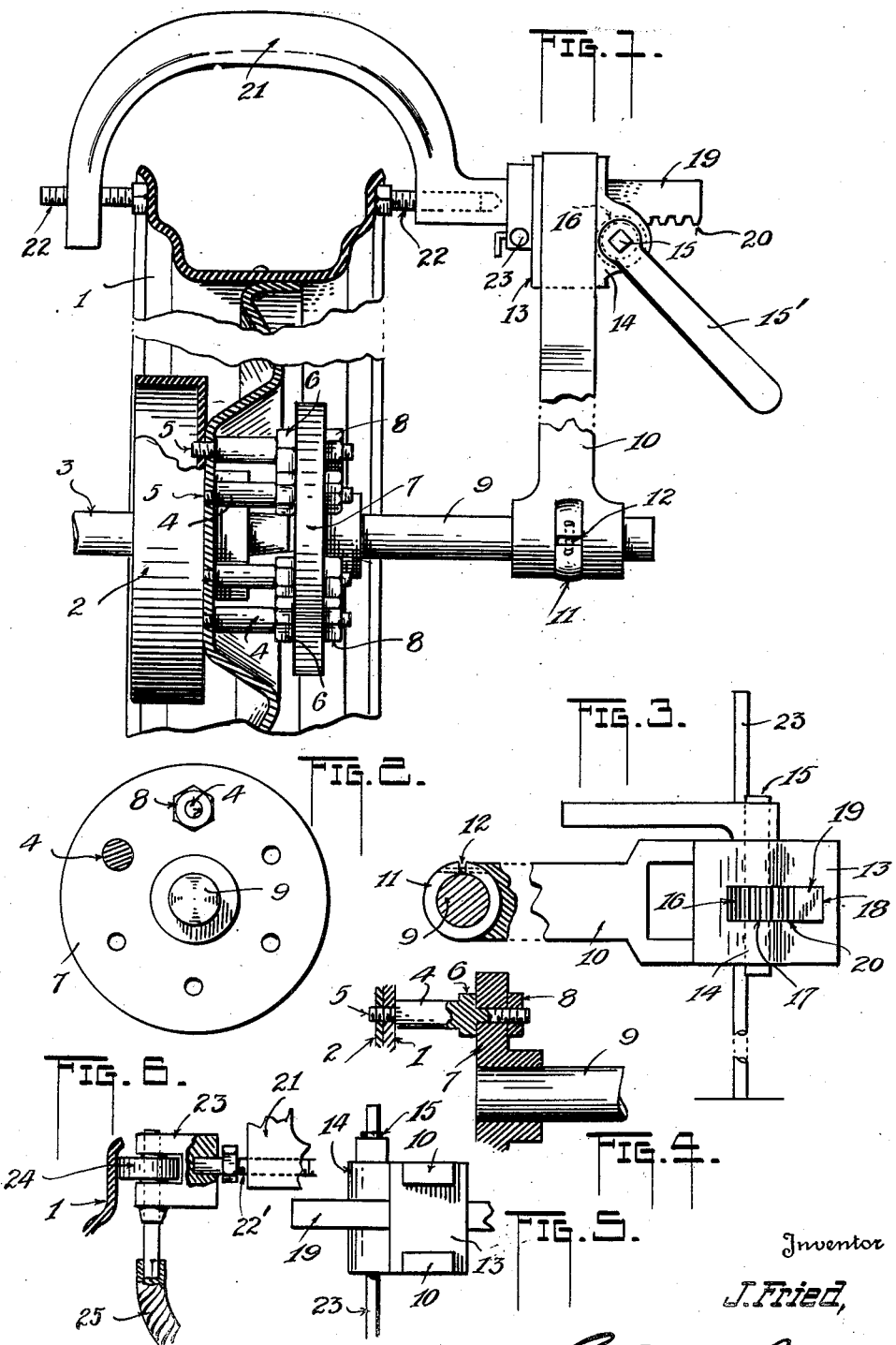

Patented Feb. 6, 1940

2,189,394

UNITED STATES PATENT OFFICE 2,189,394

APPARATUS FOR TRUING WHEELS

John Fried, Peoria, Ill.

Application June 27, 1938, Serial No. 216,186

4 Claims. (Cl. 153—32)

This invention pertains to mechanism for truing wheels of automobiles, the present invention relating particularly to means for truing wheels while mounted upon the vehicle axle.

The object of the invention is that of securing operating mechanism rigidly with respect to an unyielding portion of an automobile gearing, whether a support separate from said gearing, or to the brake-drum for example, of said gearing, or to a part to which the automobile wheel is usually affixed, such place of attachment admitting of straightening and truing a wheel and its rim even though the wheel may be of the heavy "disc" type.

In common practice it is customary and in fact necessary to remove the wheel from the axle and by a special machine operate upon the wheel to true it, such truing being with respect to its axis of rotation. However, should the axle be bent during the distorting of the wheel the thus trued wheel cannot run true by rotating in a plane paralleling the line of vehicle travel. Rather, the plane of rotation under such circumstances lies at an angle to such line of travel, the result of which is well known. The purpose of the present invention therefore is to straighten or true the wheel rim with respect to the axle so that whether the said axle is true or otherwise the wheel rim and tire will run true to the normal line.

To the end that the invention may be understood I have provided the accompanying drawing forming part hereof, wherein—

Figure 1 is a plan of a form of mechanism that will serve the purpose of the invention and shown applied to part of an automobile gearing illustrated in part section.

Figure 2 is an elevation of what may be termed a face plate shown in Figure 1, the same being a part of the mechanism of my invention.

Figure 3 is a side elevation of certain parts of said mechanism.

Figure 4 is a transverse section of the plate shown in Figure 2 showing a stud bolt in connection therewith.

Figure 5 is an elevation of parts shown in Figures 1 and 3, and

Figure 6 is detail in part section, of a modified form of part of what is shown in Figure 1.

In said figures 1 denotes a wheel of the disc type to be operated upon, the same lying against the brake drum 2, being usually secured thereto by bolts, not shown, 3 indicating the vehicle axle.

In installing the mechanism entering into the invention the named bolts are removed one or two at a time, for example, and as removed are replaced by stud bolts 4 one of which is shown in detail in Figure 4 wherein is a reduced threaded extremity 5, corresponding to a removed bolt, serves with other stud bolts to secure the wheel 1 to the named drum 2, Figure 1.

The opposite extremity of the bolt is squared, as at 6, for example, to receive a wrench by means of which said bolt may be shouldered firmly against the wheel. The outer surface of the portions form abutments to receive a face plate 7, this said plate being fixed to said stud bolts by means of nuts 8, for example. Central of the face plate 7 and extending therefrom is a support in the form of a stud 9, fixed with respect thereto, slidable along which is an arm 10, there being suitable means for preventing shifting of the arm with respect to the stud but permitting rotation of the latter in the former. In this instance, only, a ring 11 encircles the stud, lying between bifurcations of the arm, and a clamping screw 12 serves to clamp said ring upon the stud.

In the present instance the arm 10 is bifurcated at its other or free end, the bifurcations slidably receiving between them a block 13 carrying an extension 14 forming a bearing for a shaft 15 and is recessed at 16 to receive a pinion 17. In addition, the block 13 has a transverse bore 18 adjacent the pinion 17 slidable through which is a bar 19 having teeth 20 at one extremity to engage said pinion, the other end of the bar terminating in a U-shaped portion or yoke 21 adapted to receive between its arms or extensions the rim of the wheel to be operated upon, and said portion may be of such form and spread as to receive into it the rim and tire as a whole. Threaded into each arm of the portion 21 is an abutment portion in this instance a screw 22, these lying directly opposite each other.

By adjustment these screws serve to engage opposite sides of the wheel rim substantially as shown. Extending vertically through part of the block 13 is a rod 23 secured by a screw 24, for example, as in Figure 1, an end of said rod resting upon the floor and serving to support the mechanism in a horizontal position. However, the device may hang freely suspended from the stud 9 if desired.

When the stud bolts 4 are all set up snugly with the nuts 8 firmly clamping the face plate 7 to the named stud bolts the stud 9 is fixed rigidly with respect to the brake drum 2 and wheel 1 and is capable of supporting, together with the named rod 23, the weight of the arm 10 and said U-shaped member or yoke 21, and may be made sufficiently rigid to withstand great strains that may be imposed thereon in the wheel truing act.

With screws 22 in engagement with the wheel rim the endwise action of the bar 19 through the pinion 17 will accomplish the truing of the said wheel, its rim, or both. Naturally, any portion of the rim shown to be out of line may be brought to position by action of the pinion in one direction or the other according to the conditions existing. Used as a gauge either screw, too, will denote the out of place position of the rim, the out of place portion of the wheel then being acted upon by springing the wheel far enough to restore proper position while having in mind, the while, the reacting springing action of the wheel.

In connection with this act I have shown in Figure 6 a modification of the arrangement of the screws 22.

That is to say, in this figure where but one of the said screws 22 is shown, denoted at 22', both of them may have mounted thereon at its outer end a block 23 substantially as here illustrated, wherein is journaled a roller 24 to abut the wheel rim, said roller being carried and driven by a shaft 25 to be rotated by hand or power as desired. By such an arrangement or its equivalent the roller may be crowded against the rim by the described pinion 17, or otherwise, while at the same time driving said roller. This action rotates the wheel, and this, in effect, deforms the wheel by forcing it to a position where, due to roller pressure, it will become almost or quite true. Then by operation of the pinion 17 to bring the opposite roller into position, withdrawing the first, the wheel may be forced in the opposite direction until the rim occupies its proper position over the wheel hub, at which time it will be wholly restored to "true". On the other hand, the wheel itself may be rotated while a roller is in "deforming" engagement therewith to accomplish a like end. Thus, it is seen, it is not my intention to be confined to any one manner of accomplishing the desired end.

It is also seen that whereas in the first instance herein described the rim is made true by a step by step partial rotation and application of the screws 22 at various points along the rim, the last described method can be a continuous application of the rollers 24 giving a quicker final result. In this connection it is, of course, possible to rotate the wheel 1 against the roller, or either of them, the power device that drives the roller being disconnected at such times.

Since the wheel remains upon its axle it can be as properly trued as though removed and properly straightened by older methods. In addition to this there is the important fact that if the axle has been distorted the wheel will rotate in the proper plane or that paralleling the line of vehicle travel although on an axis that does not lie at right angles to that plane. Again, since the U-shaped member 21 can enclose the tire and rim as the vehicle comes into the shop the work of truing can be undertaken at once since no dismounting operations of any nature are required and in but a few minutes the vehicle can be placed back in service.

It is to be understood that while it is preferably a matter of simple operation to fix the mechanism to the brake drum or other rigid part of the vehicle gearing it could be attached to a separate support or a support separate from the gearing or any part of the vehicle, such support and the vehicle being fixed with respect to each other and thereby provide the same result in wheel truing, all as coming within the inventive idea and within the scope of some of the claims to follow.

It may be stated further, that while the structure of the apparatus throughout as described herein answers the purpose, changes of minor nature may be made without departing from the spirit and intent of the invention.

In some of the claims I shall refer to the plate 7, stud 9 and arm 10 as a support, as a whole, for the sake of brevity, while the U-shaped part 21 in some of the claims will be referred to as a "member."

I claim:

1. In apparatus for truing an automobile wheel on its axle, a plate, means for securing the plate to the wheel, a stud extending from the plate substantially in alignment with the axis of rotation of the wheel, an arm carried by the stud within which the latter is rotatable, a member carried by the arm and including a U-shaped extension to house the wheel rim including portions to abut opposite sides of the latter, and means to positively shift the members with respect to said arm.

2. In apparatus for truing an axle-mounted automobile wheel, a member fixed with respect to the wheel and rotatable therewith, a stud fixed to and extending from the member and axially in alignment with the axis of wheel rotation, an arm engaging about the stud, said stud being free to rotate with respect to the arm, and a member carried by the arm having a part adapted to abut the rim of the wheel and adjustable in the direction of the same and to be forced thereagainst.

3. In apparatus for truing an axle-mounted automobile wheel, a plurality of studs engageable with the wheel, the same being spaced around the axis of rotation of the latter, a member carried by and fixed with respect to the studs and with the latter being rotatable with the wheel, a stud fixed to the member and lying substantially in alignment with the axis of wheel rotation, an arm mounted upon the stud, and a member carried by the arm including a part adapted to abut the rim of the wheel and adjustable in the direction of the same, the stud and arm being rotatable with respect to each other.

4. In apparatus for truing an axle-mounted automobile wheel, a plurality of studs engageable with the wheel, the same being spaced around the axis of rotation of the wheel, and each having an abutment outward from the wheel, the abutments being equally spaced from the wheel's face from which the studs extend, a member engageable with the studs and seated on the abutments, said member including a stud extending therefrom whose axis is in substantial alignment with the axis of rotation of the wheel, an arm carried by the stud including a part adapted to abut the rim of the wheel and adjustable in the direction of the same, the stud and arm being rotatable with respect to each other.

JOHN FRIED.